No. 825,412. PATENTED JULY 10, 1906.
E. C. PAWLEY.
CENTRIFUGAL LIQUID SEPARATOR.
APPLICATION FILED OCT. 31, 1905.
2 SHEETS—SHEET 1.
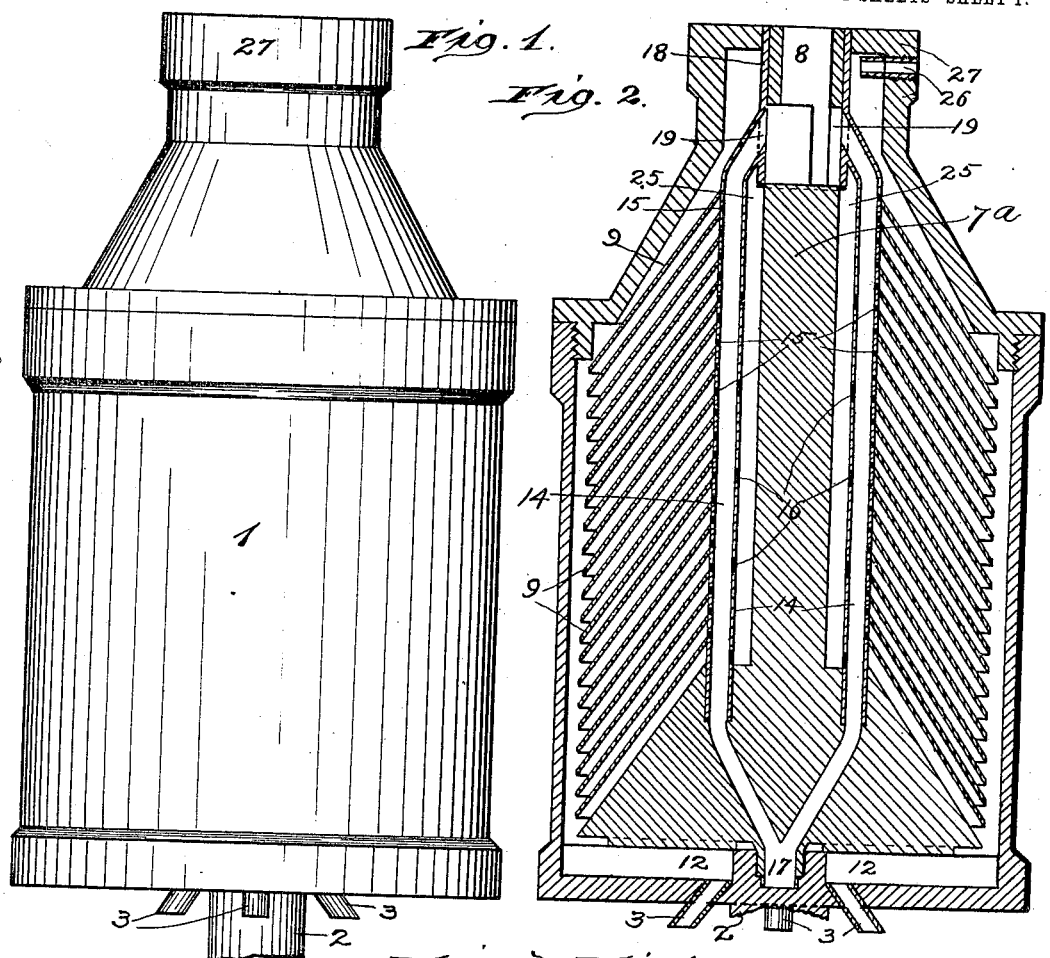
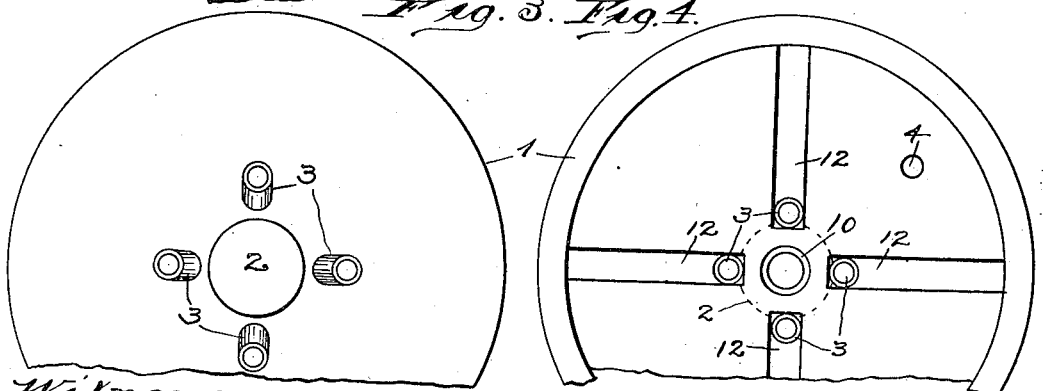
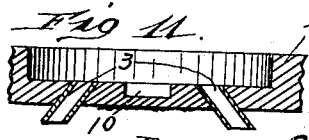

No. 825,412. PATENTED JULY 10, 1906.
E. C. PAWLEY.
CENTRIFUGAL LIQUID SEPARATOR.
APPLICATION FILED OCT. 31, 1905.
2 SHEETS—SHEET 2.
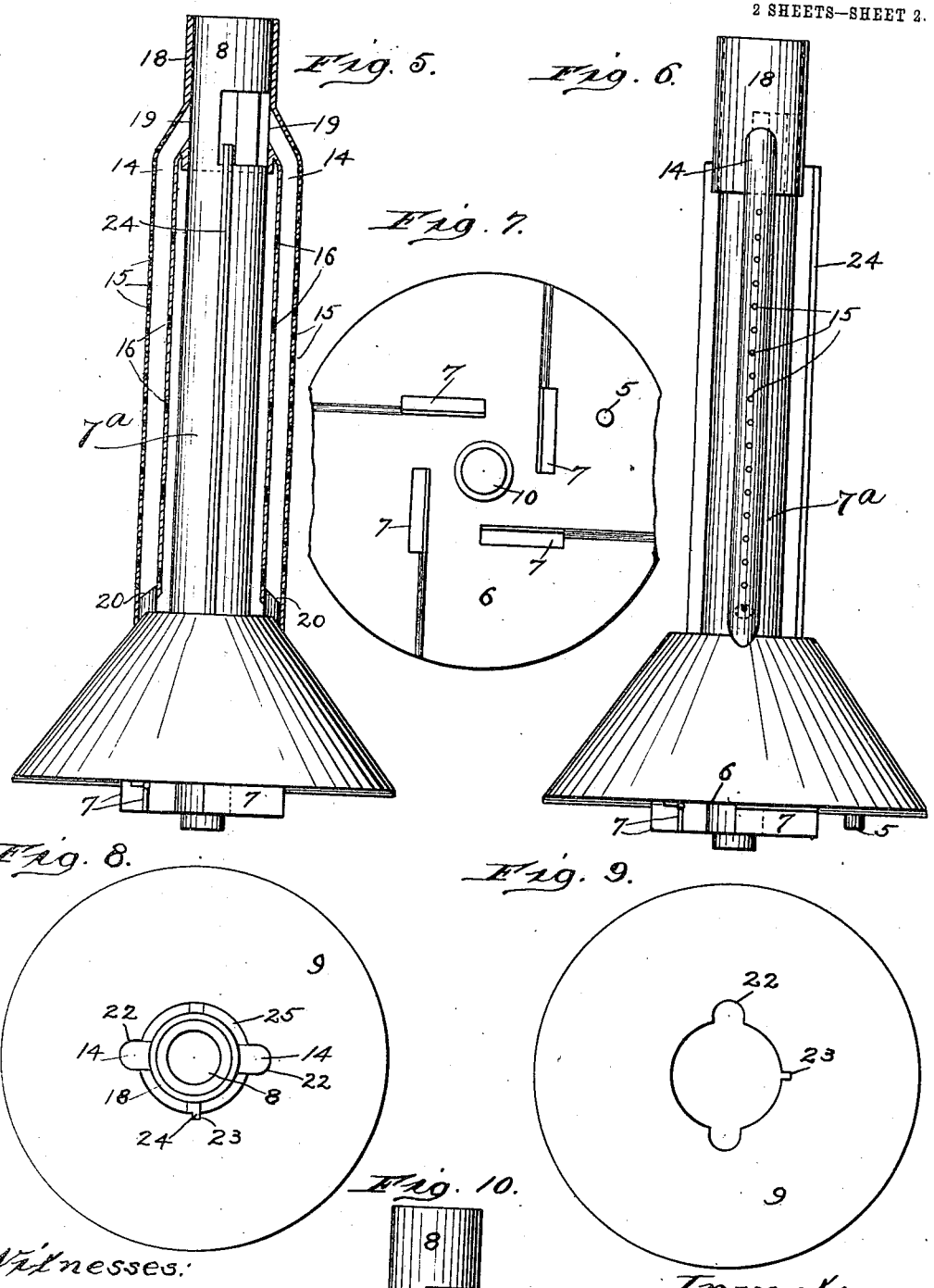
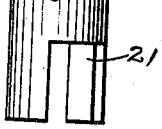

UNITED STATES PATENT OFFICE.

ERNEST C. PAWLEY, OF CHICAGO, ILLINOIS, ASSIGNOR TO SMITH MANUFACTURING COMPANY, OF CHICAGO, ILLINOIS, A CORPORATION OF ILLINOIS.

CENTRIFUGAL LIQUID-SEPARATOR.

No. 825,412.  Specification of Letters Patent.  Patented July 10, 1906.

Application filed October 31, 1905. Serial No. 285,314.

*To all whom it may concern:*

Be it known that I, ERNEST C. PAWLEY, a citizen of the United States, residing at Chicago, in the county of Cook and State of Illinois, have invented certain new and useful Improvements in a Centrifugal Liquid-Separator, of which the following is a specification.

My invention relates to centrifugally-acting separators for segregating the constituent ingredients of liquid bodies from each other, and I will describe it as applied to the separation of impurities from milk accompanied with the segregation of cream.

The principal objects of my new construction are to render the operation of separating the cream from the milk more efficient and to facilitate cleaning of the apparatus, so that it shall not become foul and convey bacteria to subsequent charges. To this end I make the parts separable and arrange them in a peculiar way, as hereinafter described.

Other features of the invention will be developed in this specification and embraced in the claims.

In the drawings, Figure 1 is a side elevation showing the exterior of the bowl and part of the spindle. Fig. 2 is a central sectional elevation through the bowl and operative elements. Fig. 3 is a bottom plan view of the bottom plate of the bowl, and Fig. 4 is a top plan view of the same. Fig. 5 is an elevation, partly in section, of the circulating apparatus. Fig. 6 is an elevation of the apparatus depicted in Fig. 5, but at right angles thereto. Fig. 7 is a bottom plan view of said circulating apparatus, showing the lugs or ribs whereby it is supported in the bowl with space beneath for the skimmed milk to flow. Fig. 8 is a top plan view of the circulatory apparatus, including one of the centrifugal separating-disks. Fig. 9 is one of the centrifugal disks in top plan view and detached. Fig. 10 is a detail showing an alternative way of separating the parts, and Fig. 11 is a modification of the collecting-chamber.

Referring now to the drawings, the reference-numeral 1 indicates the bowl, and 2 is the spindle as usual in this class of machines. The bottom of the bowl has ducts 3 to conduct the skimmed milk away and also a socket 4 to receive a locking-pin 5, projecting from the circulatory apparatus bottom 6, the latter being supported on lugs or ribs 7 to give a collecting-space beneath. The circulatory apparatus consists of a solid stem $7^a$, having its upper end hollow or formed into a tube or receptacle 8, into which the milk is introduced, and a series of conoidal centrifugal disks 9, mounted thereon, the bottom disk of which may be, but not necessarily, a solid casting with the bottom 6 on the stem $7^a$, as shown. The bottom casting 6 fits into a socket 10, but is stopped by the lugs 7, so as to leave a space for the collection of the skimmed milk, which is drained into a suitable receptacle by the aforesaid ducts 3 through the bottom plate of the bowl.

From near the top of the receptacle 8, in the upper end of the stem or rod $7^a$, through which the milk is introduced, lead parallel tubes 14, having small perforations, one or more, on their outer sides, (indicated at 15,) to each centrifugal disk, through which the milk is sprayed on said disks. On the inner side of the tubes are enlarged perforations 16, through which in the descent of the milk the lighter particles or cream corpuscles escape to be drawn up alongside the rod or stem $7^a$ and tubular portion or receptacle 8 thereof, as will be presently explained. The tubes 14 meet together at the bottom 17 to allow of the introduction of a flexible brush or swab for cleaning whenever the circulatory apparatus is lifted out of the bowl. They may be united rigidly to the receptacle 8 of the rod or stem $7^a$ or to the sleeve 18, which slips over said receptacle and connects with ports 19 therein. These pipes or tubes are divided in their length at 20, but so as to make a close fit, and can be lifted bodily off in order to be swabbed out with their sleeve and cleaned; but the pipes 14 may be permanently attached to the central stem, as shown in Fig. 2, and the upper part of said stem made removable, including ports 21 for said pipes, as indicated in Fig. 10, so that the swab may be introduced through the apex of the tubes, the latter being unbroken in their length and the entire circulatory apparatus being bodily removable from the bowl.

The centrifugal disks are formed, as usual, with suitable means for spacing. They have scallops 22 to fit over the pipes 14 and a keyway 23 to engage a feather or spline 24 on the central stem or standard to prevent displacement. In respect to these I claim nothing new.

In order to obtain more perfect separation of the liquid, a number of conoidal disks are employed, so constructed as to leave a space between each layer of disks, onto which, as already stated, the milk in its descent is sprayed through openings 15, thereby dividing the liquid or furnishing each of the disks with their separate quota and more quickly segregating the lighter liquids from the heavier.

In operation, assuming fresh milk to be the liquid which is separated it is led into the receptacle 8 and thence to pipes 14, and from these pipes in its descent the main portion is sprayed over the centrifugal disks, while some of the cream escapes through the inner perforations 16, the remainder of the cream being collected in the space 25 between the disks and central stem 7ª, together with that first taken, and drawn up to eduction-pipe 26 through crown-cap 27 of the bowl, the skimmed milk going off, as before explained, through pipes 3, leading from the bottom plate.

From the foregoing and by reference to the drawings it will be readily understood and clearly seen that as the milk is introduced into the receptacle or tubular part 8 on the upper end of the solid stem or rod 7ª it will be conducted therefrom through the pipes or tubes 14, which communicate at their upper ends with said receptacle, and as it passes down through said pipes or tubes it will be sprayed onto the disks 9 and inwardly toward the rod or stem 7ª, the central openings in the disks 9 being considerably larger than the diameter of the rod 7ª, thus forming an annular space around said rod through which the cream may pass upwardly and out through the eduction-pipe 26, while the skimmed milk will be drained through the ducts 3 in the bottom of the bowl. By thus arranging the outlet-pipes for the cream and skimmed milk—that is, the pipe for the cream being located in the upper portion of the machine and the outlet-pipes for the skimmed milk in the bottom or lower portion thereof—it is evident that a more thorough and effective separation is attained.

Having thus fully described my invention, what I claim as new, and desire to secure by Letters Patent, is—

1. In a centrifugal separating apparatus, the combination with the bowl, of a central stem having a receptacle in its upper portion, and spraying-pipes communicating at their upper ends with said receptacle and extending downwardly alongside said stem.

2. In a centrifugal separating apparatus, the combination with the bowl, of a central stem having a receptacle in its upper portion for the introduction of milk, spraying-pipes fed from the receptacle and extending downwardly alongside said stem and having small spraying-apertures on their outer sides and larger apertures on their inner sides.

3. In a centrifugal separating apparatus, the combination with the bowl, of a central stem having a receptacle in its upper portion for the introduction of milk, spraying-pipes fed from the receptacle and extending downwardly alongside said stem, and conoidal disks detachably mounted on the spraying-pipes and surrounding said stem at a distance therefrom.

4. In a centrifugal separating apparatus, the combination with the bowl having in its upper portion an outlet for the cream and its bottom outlets for the milk, of a central stem having a receptacle in its upper portion and a conoidal base at its other end, spraying-pipes communicating at their upper ends with said receptacle and extending downwardly alongside said stem at a distance therefrom, the lower ends of said pipes converging, and a series of spaced-apart conoidal disks detachably mounted on the spraying-pipes and surrounding the central stem at a distance therefrom.

ERNEST C. PAWLEY.

Witnesses:
CHAS. C. TILLMAN,
CHAS. E. GORTON.